(12) United States Patent
Suzuki et al.

(10) Patent No.: US 12,533,593 B2
(45) Date of Patent: Jan. 27, 2026

(54) INFORMATION PROCESSING DEVICE AND REPORT CREATION SUPPORT METHOD

(71) Applicant: SONY INTERACTIVE ENTERTAINMENT INC., Tokyo (JP)

(72) Inventors: Kazuhiro Suzuki, Tokyo (JP); Takato Yorozuya, Tokyo (JP); Takuma Oiwa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 294 days.

(21) Appl. No.: 18/030,562

(22) PCT Filed: Nov. 1, 2021

(86) PCT No.: PCT/JP2021/040240
§ 371 (c)(1),
(2) Date: Apr. 6, 2023

(87) PCT Pub. No.: WO2022/097604
PCT Pub. Date: May 12, 2022

(65) Prior Publication Data
US 2023/0372824 A1 Nov. 23, 2023

(30) Foreign Application Priority Data
Nov. 6, 2020 (JP) .................. 2020-186009

(51) Int. Cl.
*A63F 13/75* (2014.01)
*A63F 13/847* (2014.01)
*A63F 13/87* (2014.01)

(52) U.S. Cl.
CPC ............ *A63F 13/75* (2014.09); *A63F 13/847* (2014.09); *A63F 13/87* (2014.09)

(58) Field of Classification Search
CPC ........ A63F 13/75; A63F 13/847; A63F 13/87; A63F 13/35; A63F 13/795; G06F 3/01;
(Continued)

(56) References Cited

U.S. PATENT DOCUMENTS 8,026,913 B2 * 9/2011 Garbow ................ A63F 13/525
345/419
8,239,776 B2 * 8/2012 Bates ...................... A63F 13/30
715/764

(Continued)

FOREIGN PATENT DOCUMENTS

JP   2003325983 A   11/2003
JP   2010224842 A   10/2010
(Continued)

OTHER PUBLICATIONS

Jorasch et al., U.S. Appl. No. 63/031,561, filed May 28, 2020 (Year: 2020).*

(Continued)

*Primary Examiner* — Michael A Cuff
(74) *Attorney, Agent, or Firm* — Fish & Richardson P.C.

(57) ABSTRACT

A first recording section 152 records chat data that is voice data, in association with time information. A second recording section 154 records metadata including information indicating a person who has made an utterance, in association with time information. An input image generating section 124 generates an input image for a user to create a report. A report creating section 170 receives information input by the user and creates a report relating to a chat.

18 Claims, 14 Drawing Sheets

(58) Field of Classification Search
CPC .. G06F 3/16; G06F 3/00; G06Q 10/10; H04L 51/04
USPC .......................................................... 463/31
See application file for complete search history.

(56) References Cited

U.S. PATENT DOCUMENTS

| | | | | |
|---|---|---|---|---|
| 11,400,378 | B2* | 8/2022 | Dorn | A63F 13/75 |
| 11,596,870 | B2* | 3/2023 | Rudi | A63F 13/79 |
| 2009/0111583 | A1* | 4/2009 | Zalewski | A63F 13/35 |
| | | | | 463/42 |
| 2009/0174702 | A1* | 7/2009 | Garbow | G06Q 50/265 |
| | | | | 345/419 |
| 2010/0081508 | A1* | 4/2010 | Bhogal | A63F 13/75 |
| | | | | 463/40 |
| 2010/0105484 | A1* | 4/2010 | Horneff | A63F 13/79 |
| | | | | 463/43 |
| 2014/0073429 | A1* | 3/2014 | Meneses | A63F 13/215 |
| | | | | 463/35 |
| 2017/0225079 | A1* | 8/2017 | Conti | A63F 13/35 |
| 2018/0207535 | A1* | 7/2018 | Seo | A63F 13/67 |
| 2018/0229128 | A1* | 8/2018 | Chandrasekaran | A63F 13/87 |
| 2019/0089731 | A1* | 3/2019 | Park | H04L 63/1441 |
| 2020/0306631 | A1* | 10/2020 | Karlsson | A63F 13/355 |
| 2021/0077904 | A1* | 3/2021 | Yen | A63F 13/5255 |
| 2021/0134285 | A1* | 5/2021 | Santiago | G10L 15/30 |
| 2021/0137266 | A1* | 5/2021 | Pestl | G03B 17/561 |
| 2021/0370188 | A1* | 12/2021 | Thomas | A63F 13/355 |
| 2021/0374391 | A1* | 12/2021 | Jorasch | G06V 40/19 |
| 2021/0402304 | A1* | 12/2021 | Dorn | A63F 13/493 |
| 2022/0066990 | A1* | 3/2022 | Clingman | G06F 16/168 |
| 2022/0292825 | A1* | 9/2022 | Fang | H04N 21/816 |
| 2025/0014588 | A1* | 1/2025 | Yost | G10L 21/0232 |

FOREIGN PATENT DOCUMENTS

| | | |
|---|---|---|
| JP | 2018092416 A | 6/2018 |
| JP | 2020054885 A | 4/2020 |
| WO | 2020075594 A1 | 4/2020 |

OTHER PUBLICATIONS

International Search Report and Written Opinion mailed Feb. 8, 2022, from PCT/JP2021/040240, 10 sheets.

* cited by examiner

FIG. 8

REPORT REGARDING VOICE CHAT

WHAT IS YOUR REASON FOR REPORTING?

- DISCRIMINATORY REMARK
- VIOLENT REMARK — 204
- SEXUAL REMARK
- DEFAMATORY REMARK
- OTHERS

CANCEL

REPORT REGARDING VOICE CHAT

SUMMARY OF YOUR REPORT

TROUBLING PLAYER : USER B

SUBJECT OF REPORT : VOICE CHAT

REASON : VIOLENT REMARK

REPORT CONTENT : LOUDLY INSULTED

CANCEL    SEND REPORT

4

INFORMATION PROCESSING DEVICE AND REPORT CREATION SUPPORT METHOD

TECHNICAL FIELD

The present disclosure relates to a technique that supports creation of reports regarding chats.

BACKGROUND ART

PTL 1 discloses a chat system in which a client device side can centrally manage a chat room in which a user can participate. The client device stores the chat history information received from a matching server as a result of participation in the chat room, in a storage section in association with the reception date and time and the room identification information for identifying the chat room, and displays, on a monitor device, an image in which pieces of the chat history information are arranged in chronological order and which is included in the chat screen of the chat room.

CITATION LIST

Patent Literature

[PTL 1]
Japanese Patent Laid-open No. 2010-224842

SUMMARY

Technical Problem

Chat applications realize real-time communication and are used in various situations such as hobbies and business. In an online multi-game in which a plurality of players participate in one session and play the game together, attractiveness of the game can be enhanced by the players playing the game while chatting with each other.

Incidentally, in recent years, it has become common for players who are strangers to each other to play games together, and opportunities to encounter players who make inappropriate remarks is increasing compared to the case where friends who know each other play games together. For the purpose of maintaining a comfortable playing environment, it is desirable to achieve a mechanism that allows a user who encounters a player who makes an inappropriate remark to easily report the presence of such a player to the operator of the game network.

Accordingly, an object of the present disclosure is to provide a technique for supporting creation of a report regarding chats.

Solution to Problem

In order to solve the above problem, an aspect of the present disclosure is an information processing device that supports creation of a report regarding a chat, which includes a recording section that records chat data, an image generating section that generates an input image for a user to create the report, and a report creating section that receives information input by the user and creates the report regarding the chat.

Another aspect of the present disclosure is a method for supporting creation of a report regarding a chat, including the steps of recording chat data, generating an input image for a user to create the report, and creating the report regarding the chat by receiving information input by the user.

Yet another aspect of the present disclosure is an information processing device that includes a chat data processing section that acquires chat data, an output processing section that outputs chat voice, and a ring buffer that records the chat data.

It should be noted that any combination of the above-described constituent elements and expressions of the present disclosure converted between methods, devices, systems, recording media, computer programs, etc., are also effective as aspects of the present disclosure.

BRIEF DESCRIPTION OF DRAWINGS

FIG. 8 is a diagram illustrating an example of a reason selection image for selecting a reason for reporting.

FIG. 14 is a diagram illustrating an example of a report summary.

DESCRIPTION OF EMBODIMENT

Figure 1:
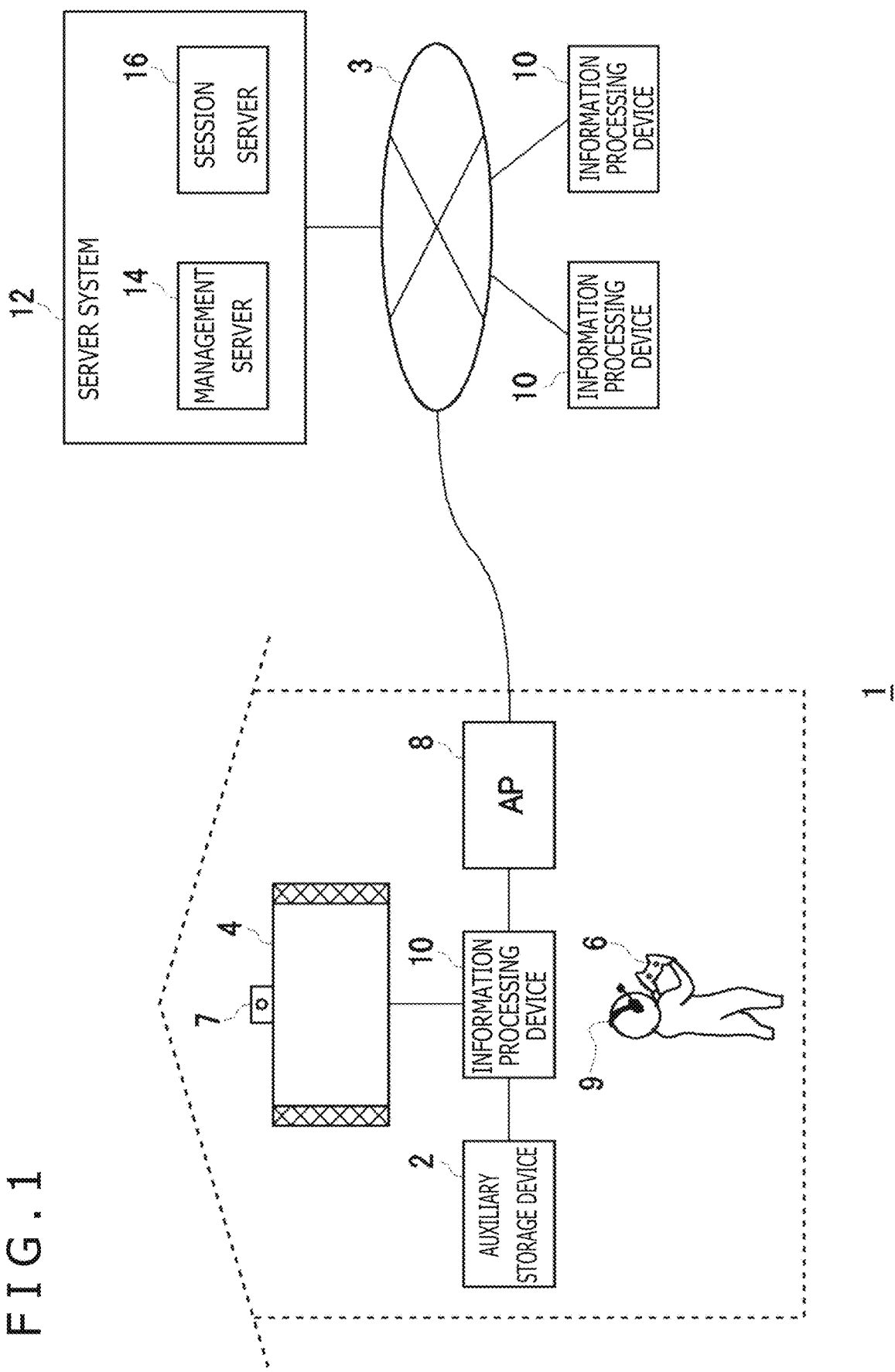
FIG. 1 is a diagram illustrating an information processing system according to an embodiment.

FIG. 1 illustrates an information processing system 1 according to an embodiment of the present disclosure. The information processing system 1 includes a plurality of information processing devices 10 operated by a plurality of users, and a server system 12, which are connected via a network 3 such as the Internet or a LAN (Local Area Network). An access point (hereinafter referred to as an "AP") 8 has functions of a wireless access point and a router, and an information processing device 10 is communicably connected with the server system 12 on the network 3 by connecting to the AP 8 in a wired or wireless manner.

The information processing device 10 is, in a wired or wireless manner, connected to an input device 6 operated by a user, and the input device 6 outputs information regarding operation performed by the user to the information processing device 10. When receiving operation information from the input device 6, the information processing device 10 reflects the operation information in the processing of the system software or application software, and causes an output device 4 to output the processing result. In the information processing system 1, the information processing device 10 is a game device (game console) that executes game software, and the input device 6 may be a device that supplies user operation information to the information processing device 10, such as a game controller. Incidentally, the input device 6 may be an input interface such as a keyboard or a mouse.

An auxiliary storage device 2 is a large-capacity storage device such as an HDD (Hard Disk Drive) or a flash memory, or may be an external storage device connected to the information processing device 10 via a USB (Universal Serial Bus) or the like or a built-in storage device. The output device 4 may be a television having a display for outputting images and speakers for outputting sounds, or may be a computer display. The output device 4 may be connected to the information processing device 10 with a cable, or may be wirelessly connected.

A camera 7 as an imaging device is provided near the output device 4 and captures an image of the space around the output device 4. Although FIG. 1 illustrates an example in which the camera 7 is attached to the top of the output device 4, the camera 7 may be placed on the side or bottom of the output device 4, and is positioned, in any case, in such a manner as to capture an image of the user located in front of the output device 4. The camera 7 may be a stereo camera. In the embodiment, the user wears a headset 9 for voice chats.

The server system 12 includes a management server 14 and a session server 16, and is maintained and managed by the operator of the information processing system 1. A user has a user account that uniquely identifies him/herself, and by using the user account and signing in to the management server 14, the user can use the services provided by the management server 14 and the session server 16.

The session server 16 manages the state of sessions created by games. The session server 16 manages, for the session created by the game, information regarding the title of the game to be played, the user account of the user who has created the session (session leader), the user accounts of the users participating in the session, the duration of the session, and the like. When the session state changes, the system software of the information processing device 10 transmits information indicating the change to the session server 16, and the session server 16 manages the latest state of the session.

When one user selects the game's multiplayer mode after activating the game, the game creates a session relating to the game. By another user participating in the created game session, a plurality of users can play games together and chat in the game session. There are various ways to participate in the game session, and, for example, a user can participate in a session by sending a message requesting participation to the session leader and receiving permission from the session leader. Note that, in the information processing system 1, it is not always necessary for users to participate in a game session, in order to chat with each other, and users may be able to chat with each other by using a chat application unrelated to games.

In the embodiment, a case in which a plurality of users perform voice chats while playing a game will be described, and at this time, the voice chat may be performed while the images of the partners are displayed. In the embodiment, the information processing devices 10 of respective users are connected to each other in a P2P (Peer to Peer) way, and audio data is transmitted and received between the plurality of information processing devices 10, realizing a voice chat. In another example, a chat server may be provided in the server system 12, and voice data may be transmitted and received between the plurality of information processing devices 10 via the chat server.

The management server 14 has a function of receiving reporting (reports) on chats from users. When a user encounters a player who makes an inappropriate remark during a chat, the user provides the management server 14 with voice data including the remark of the player, and reports that an inappropriate remark has been made. The information processing device 10 of the embodiment supports the user in creating a report. When receiving a report related to a chat from the information processing device 10, the administrator of the management server 14 analyzes the voice data included in the report and investigates the statements. Note that the management server 14 may use a machine learned model or the like to automatically analyze the contents of the remark.

Figure 2:
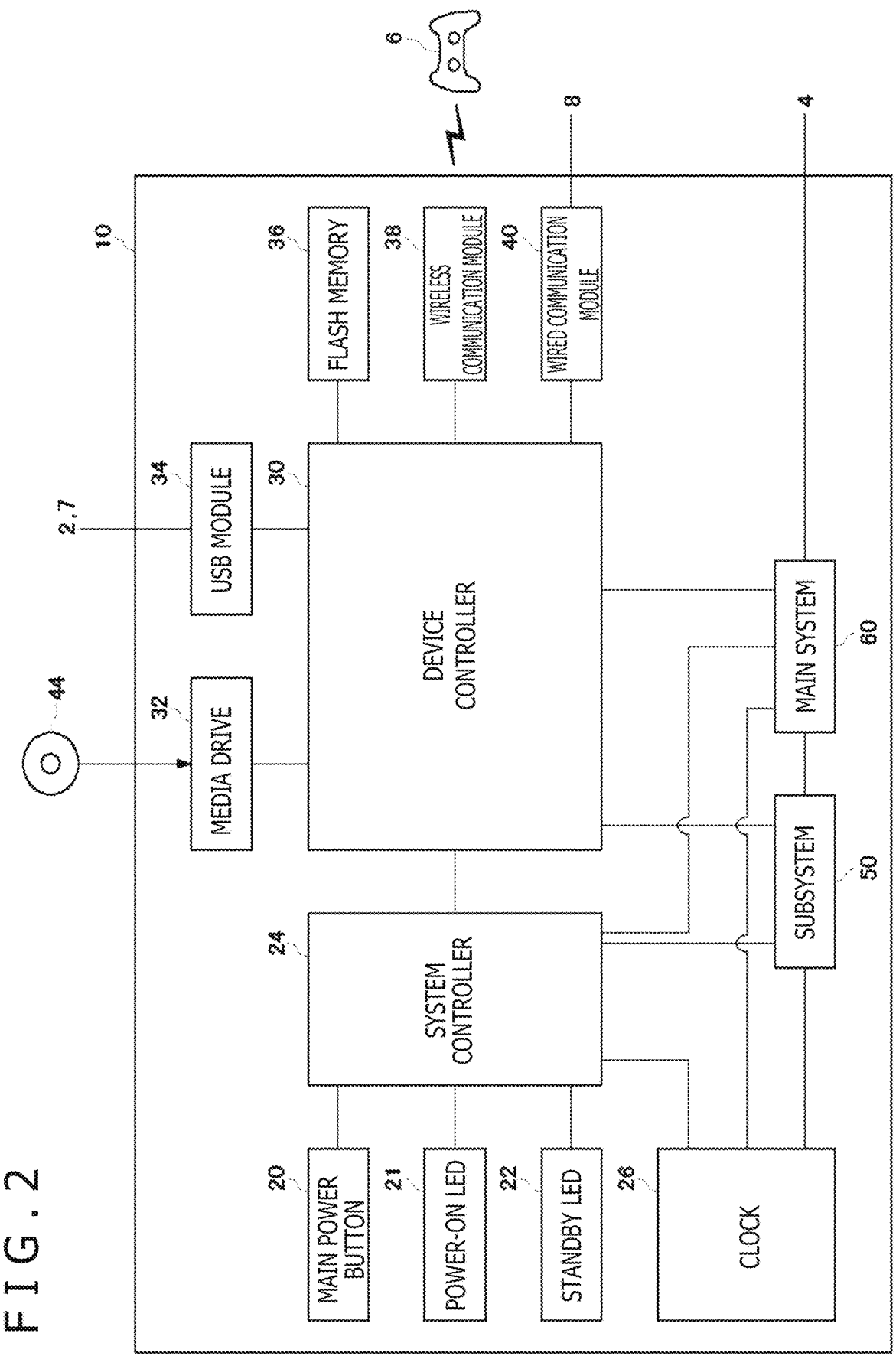
FIG. 2 is a diagram illustrating a hardware configuration of an information processing device.

FIG. 2 illustrates the hardware configuration of the information processing device 10. The information processing device 10 includes a main power button 20, a power-ON LED (Light Emitting Diode) 21, a standby LED 22, a system controller 24, a clock 26, a device controller 30, a media drive 32, a USE module 34, a flash memory 36, a wireless communication module 38, a wired communication module 40, a subsystem 50, and a main system 60.

The main system 60 includes a main CPU (Central Processing Unit), a memory that is a main storage device, a memory controller, a GPU (Graphics Processing Unit), and the like. The GPU is mainly used for arithmetic processing of game programs. The main CPU has functions of starting an OS (Operating System) and executing the game program installed in the auxiliary storage device 2 under the environment provided by the OS. The subsystem 50 includes a sub-CPU, a memory that is a main storage device, a memory controller, and the like, but not a GPU.

While the main CPU has the function of executing game programs installed in the auxiliary storage device 2 or a ROM (Read Only Memory) medium 44, the sub-CPU does not have such a function. However, the sub-CPU has a function of accessing the auxiliary storage device 2 and a function of transmitting/receiving data to/from the server system 12. The sub-CPU is configured with only such limited processing functions, and can hence operate with low power consumption compared to the main CPU. The functions of these sub-CPU are executed when the main CPU is in the standby state.

The main power button 20 is an input unit for inputting an operation by the user, and is provided on the front surface of the housing of the information processing device 10, to be operated for turning on or off the power supply to the main system 60 of the information processing device 10. The power-ON LED 21 lights up when the main power button 20 is turned on, and the standby LED 22 lights up when the main power button 20 is turned off. The system controller 24 detects pressing of the main power button 20 by the user.

The clock 26 is a real-time clock that generates information regarding current date and time and supplies the information to the system controller 24, the subsystem 50, and the main system 60.

The device controller 30 is configured as an LSI (Large-Scale Integrated Circuit) that exchanges information between devices, like a south bridge. As illustrated, such devices as the system controller 24, the media drive 32, the USB module 34, the flash memory 36, the wireless communication module 38, the wired communication module 40, the subsystem 50, and the main system 60 are connected to the device controller 30. The device controller 30 absorbs differences in electrical characteristics and data transfer speeds of the respective devices, and controls the timing of data transfer.

The media drive 32 is a drive device to which the ROM medium 44 that records application software of games or the like and license information is mounted for driving, and reads programs, data, and the like from the ROM medium 44. The ROM medium 44 is a read-only recording medium such as an optical disk, a magneto-optical disk, or a Blu-ray disk.

The USB module 34 is a module that connects to an external device with a USB cable. The USB module 34 may be connected to the auxiliary storage device 2 and the camera 7 with a USB cable. The flash memory 36 is an auxiliary storage device that constitutes an internal storage. The wireless communication module 38 wirelessly communicates with, for example, the input device 6 by using a communication protocol such as the Bluetooth (registered trademark) protocol or the IEEE (Institute of Electrical and Electronics Engineers) 802.11 protocol. The wired communication module 40 performs wired communication with an external device and connects to the network 3 via the AP 8, for example.

Figure 3:
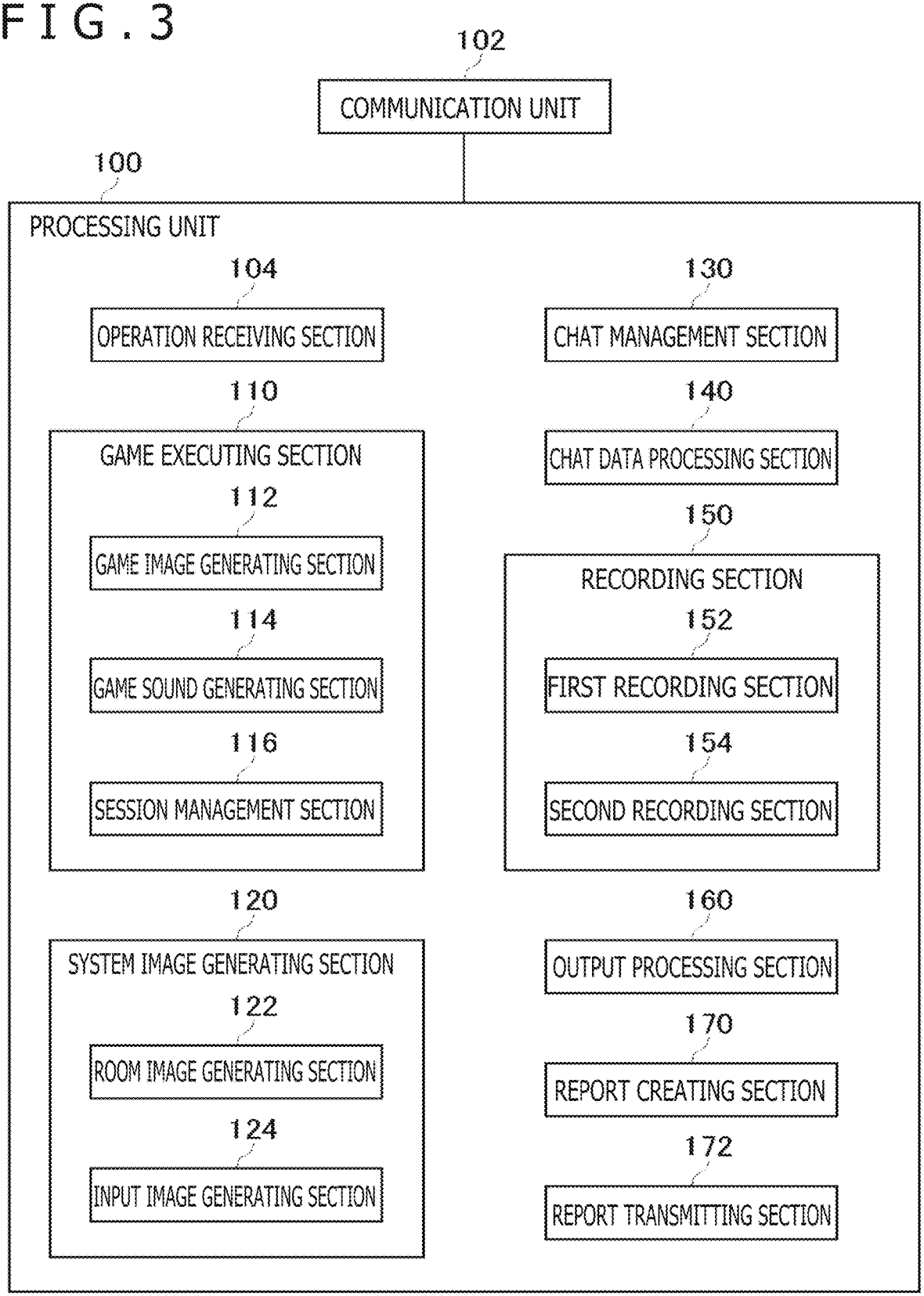
FIG. 3 is a diagram illustrating functional blocks of the information processing device.

FIG. 3 illustrates functional blocks of the information processing device 10. The information processing device 10 of the embodiment includes a processing unit 100 and a communication unit 102, and has a function of supporting creation of a report regarding chats. The processing unit 100 includes an operation receiving section 104, a game executing section 110, a system image generating section 120, a chat management section 130, a chat data processing section 140, a recording section 150, an output processing section 160, a report creating section 170, and a report transmitting section 172. The game executing section 110 has a game image generating section 112, a game sound generating section 114, and a session management section 116. The system image generating section 120 has a room image generating section 122 and an input image generating section 124. The recording section 150 has a first recording section 152 and a second recording section 154.

In FIG. 3, respective elements described as functional blocks that perform various processes can be configured by circuit blocks, memories, and other LSIs in terms of hardware, and system software, a game program loaded in a memory, or the like in terms of software. Hence, those skilled in the art will understand that these functional blocks can be realized in various forms by hardware only, software only, or a combination thereof, and are not limited to either one.

The communication unit 102 receives operation information as to how the user has operated the input unit of the input device 6 and provides the operation receiving section 104 with the operation information. Also, the communication unit 102 communicates with the management server 14 and the session server 16 to transmit and receive various types of information or data. The communication unit 102 may have both the functions of the wireless communication module 38 and the wired communication module 40.

The operation receiving section 104 receives operation information regarding the input device 6 via the communication unit 102. In the embodiment, the game executing section 110 executes a game program to generate image data and sound data of the game. The function represented as the game executing section 110 is implemented by system software, a game program, and hardware, such as a GPU that executes rendering processing, and the like. Incidentally, a game is an example of an application, and the game executing section 110 may execute an application other than a game.

During the game play by the user, the operation receiving section 104 supplies the operation information regarding the input device 6 to the game executing section 110, and the game image generating section 112 performs arithmetic processing to move the player character in the virtual space, in reference to the operation information. The game image generating section 112 includes a GPU, and receives the result of arithmetic processing in the virtual space, thereby generating game image data from a viewpoint position (virtual camera) in the virtual space. The game sound generating section 114 generates game sound data from the viewpoint position in the virtual space.

Figure 4:
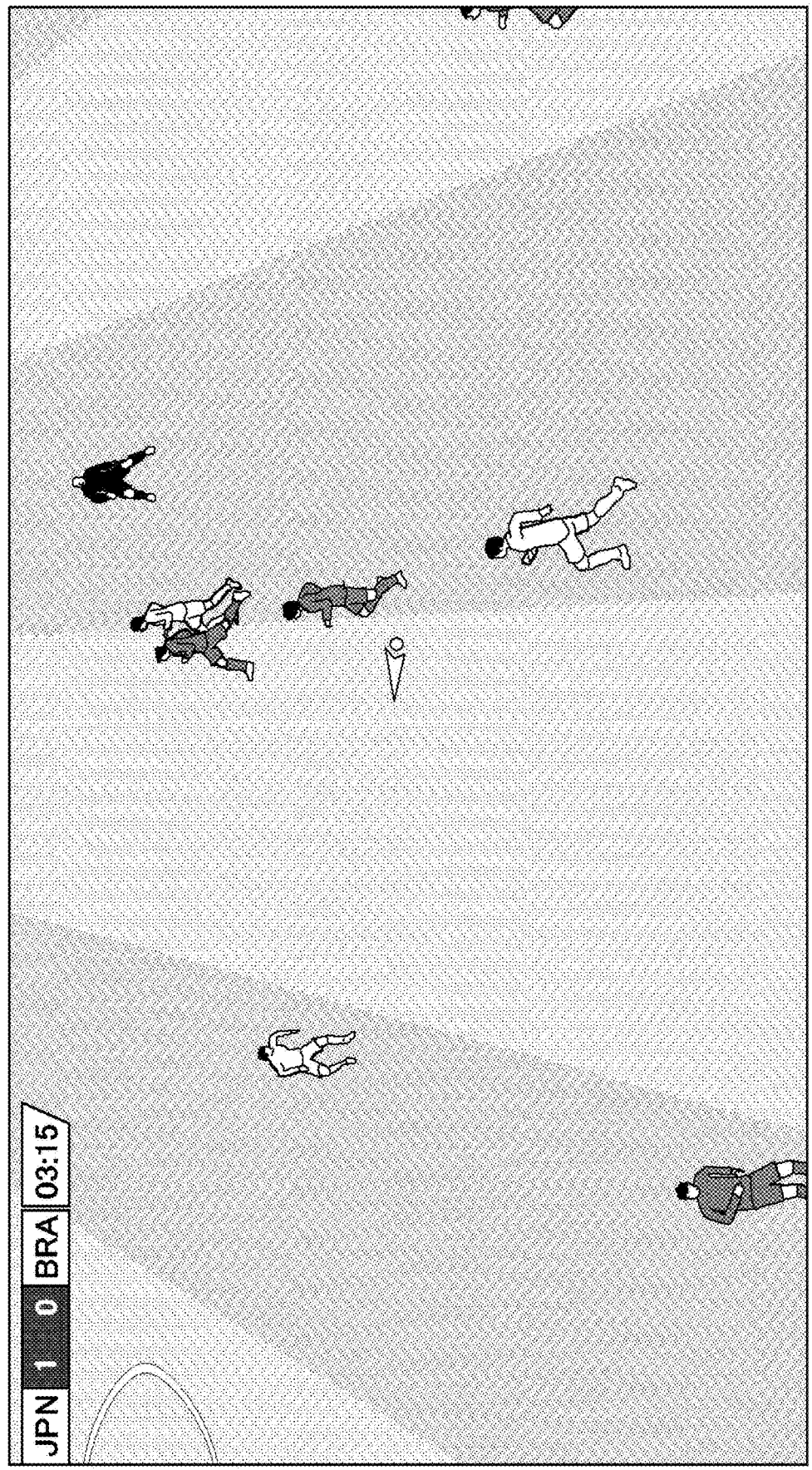
FIG. 4 is a diagram illustrating an example of a game image.

FIG. 4 illustrates an example of a game image displayed on the output device. The output processing section 160 displays game images from the output device 4 and outputs game sounds from the headset 9. Note that, in the case where the user does not wear the headset 9, the output processing section 160 may output the game sound from the speaker of the output device 4. Incidentally, the output device 4 may be an HMD (Head Mounted Display).

When the multiplayer mode of the game is selected by the user, the session management section 116 creates a session under the condition that the connection environment with the network 3 is satisfactory, and sends the session information including user ID (Identification) of the user, identification information (game ID) of the game, and the like to the session server 16. Note that the game may explicitly prepare a menu item for "Create a session," and the session management section 116 may create a session when the user selects the menu item.

When a session is created, the session server 16 returns session identification information (session ID) to the game and manages the state of the session. In the case where the user allows the session to be open, the session server 16 opens the session on the network 3, so that other users can find and participate in the session. The information processing devices 10 of a plurality of users participating in the session are connected to each other by P2P communication.

The session management section 116 holds pieces of identification information (user IDs) of a plurality of users participating in the session, and manages the participating users as members of the session group. The user ID may be a user account, but may be identification information different from the user account, such as an online ID used online. The session management section 116 manages members who newly join a session or members who leave the session, and provides the chat management section 130 with the user IDs of all the members forming the session group. This allows the chat management section 130 to recognize all users participating in the session. When receiving a chat participation request from a user participating in a session, the chat management section 130 allows the user to participate in the chat room. Hereinafter, the process in the case where the session leader is "user A" and users B, C, and D participate in the chat room will be described.

In the information processing device 10 operated by user A, the chat management section 130 sends information for identifying chat partners of each user (hereinafter, also referred to as "chat partner identification information") to the information processing devices 10 of users B, C, and D. To be specific, users A, C, and D are chat partners for user B, users A, B, and D are chat partners for user C, and users A, B, and C are chat partners for user D. The chat partner identification information may be the member's user ID or the device ID of the member's information processing device 10. The information processing device 10 of another user connected to the information processing device 10 of user A in a P2P way can identify the information processing device 10 of the member to which the chat data is to be transmitted, by being notified of the chat partner identifying information. This realizes chats between members. In the embodiment, the mode of a performed chat is a voice chat, and the chat data is voice data of voice sound made by the user, but may also be a video chat, and in this case, the chat data includes voice data of utterance made by the user and video data obtained by imaging the user.

In each member's information processing device 10, the chat data processing section 140 transmits the member's chat data (voice data) input to the microphone of the headset 9, together with the user ID, to the chat partner's information processing device 10, and receives chat data transmitted from the chat partner and supplies the data to the output processing section 160 and the recording section 150. In the case where there are a plurality of chat partners, the chat data processing section 140 mixes chat data transmitted from the information processing devices 10 of the plurality of chat partners, and supplies the mixed chat data to the output processing section 160 and the recording section 150. During game play, the output processing section 160 mixes the game sound data and the chat voice data, and outputs the mixture to the headphones of the headset 9. In the case where the user does not wear the headset 9, for example, a microphone is placed around the camera 7, and the chat data processing section 140 may transmit the member's chat data input to the microphone to the information processing device 10 of the chat partner, and the output processing section 160 may mix the game sound data and the voice data transmitted from the chat partner to output the mixture to the speaker of the output device 4. Note that the camera 7 may have a microphone.

A specific method of processing chat data and its metadata by the chat data processing section 140 will be described below.

The chat data processing section 140 acquires, together with the user ID of the chat partner, voice data (chat data) indicating the utterance of the chat partner from the chat partner's information processing device 10. In the information processing device 10 of user A, the chat data processing section 140 acquires the chat data transmitted from the information processing devices 10 of users B, C, and D, and mixes the voices of the three to output the mixture from the output processing section 160. At the same time, the chat data processing section 140 records the mixed chat data in the first recording section 152 in association with the information regarding time of reception of the chat data (time stamp), and in addition, records metadata including information indicating the user who has made utterance in the second recording section 154 in association with the time information (time stamp). Incidentally, the chat data recorded in the first recording section 152 is the chat data available before the game sound is mixed by the output processing section 160. That is, the first recording section 152 records chat data that is not mixed with game sound data.

The chat data processing section 140 may have a function of deriving the sound volume in real time from the chat data of each user and extracting the utterance segment of each chat data. In the case where the sound volume of chat data is less than the predetermined value, the chat data processing section 140 regards the chat data as silent data, and when the sound volume is equal to or greater than the predetermined value, the chat data is regarded as voiced data. The chat data processing section 140 may perform control such that the output processing section 160 does not output silent data and outputs only the voiced data.

The chat data processing section 140 records only voiced data in the first recording section 152 in association with the time information, and records metadata including information (user ID) indicating the user who has made the utterance, in association with information regarding time at which the voiced data is included, in the second recording section 154. Hence, the second recording section 154 records metadata that associates the time zone in which the voiced data exists with the user ID of the person who made the utterance in the voiced data.

The first recording section 152 may record chat data for a predetermined time period of chat, and the second recording section 154 may record metadata for the predetermined time period of chat. Both the first recording section 152 and the second recording section 154 may be ring buffers configured to record data in a cyclical manner, with the end and the top logically connected.

The first recording section 152 is generated by the first start address and the first end address of the recording area of the auxiliary storage device 2 being set. This ring buffer area may be set in advance when the information processing device 10 is shipped. The chat data processing section 140 mixes the voiced data of respective users and records the mixture in the first recording section 152 together with time information (time stamp).

The chat data processing section 140 records the mixed chat data in the first recording section 152 in a predetermined address order from the first start address, and returns to the first start address to overwrite the data after recording up to the first end address, thereby repeating the processing. For example, the first recording section 152 may be set to record 5-minute chat data in association with the time stamp. By recording the chat data in the first recording section 152, in the case where another chat member makes an inappropriate remark, user A can cut out the relevant portion of the inappropriate remark from the chat data recorded in the first recording section 152, and cause the voice data including the inappropriate remark to be included in the report to be sent to the administrator of the management server 14.

The second recording section 154 is generated by the second start address and the second end address of the recording area of the auxiliary storage device 2 being set. This ring buffer area may be set in advance at the time of shipment of the information processing device 10, as with the first recording section 152. The chat data processing section 140 records the metadata in the second recording section 154 in a predetermined address order from the second start address, and returns to the second start address to overwrite the data after recording up to the second end address, thereby repeating the processing. The second recording section 154 may be set to record metadata for the same time period as that of the first recording section 152 (for example, 5 minutes). The recorded metadata is associated with a time stamp.

When the operation receiving section 104 receives a predetermined operation of the input device 6 during game play, the system image generating section 120 acquires information indicating the status of members participating in the chat room from the management server 14. In the system image generating section 120, the room image generating section 122 generates system image data indicating the status of the chat room in which the chat members are participating, and supplies the system image data to the output processing section 160. The output processing section 160 generates a display image in which the system image is superimposed on the game image, and causes the output device 4 to output the display image. As a result, the output device 4 displays an image in which the system image is superimposed on the game image.

Figure 5:
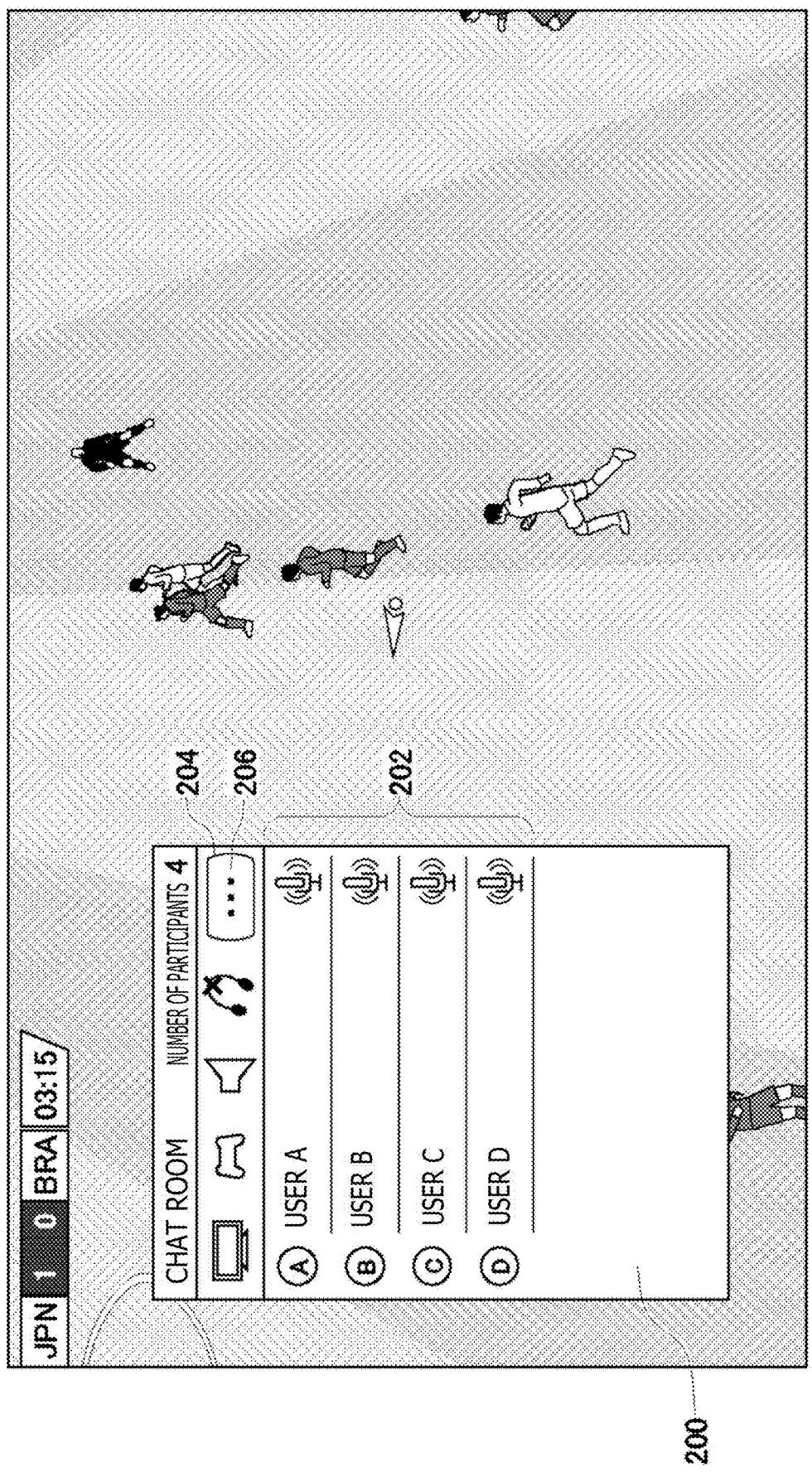
FIG. 5 is a diagram illustrating an example of a system image superimposed on the game image.

FIG. 5 illustrates an example of a system image 200 superimposed on a game image. The room image generating section 122 generates system image data indicating the status of the chat room, in reference to the information indicating the status of each chat member acquired from the management server 14. The system image 200 includes a plurality of menu items and a member display field 202 that indicates status of members in the chat room. The member display field 202 displays information indicating chat member icons, user names, and whether the microphone is on or off. In this example, all members turn on their microphones and are engaged in voice chat. When the user moves a selection frame 204 to a More icon 206 and performs a selection operation, the room image generating section 122 displays, in the sub-window, menu items that have not been displayed in the system image 200.

Figure 6:
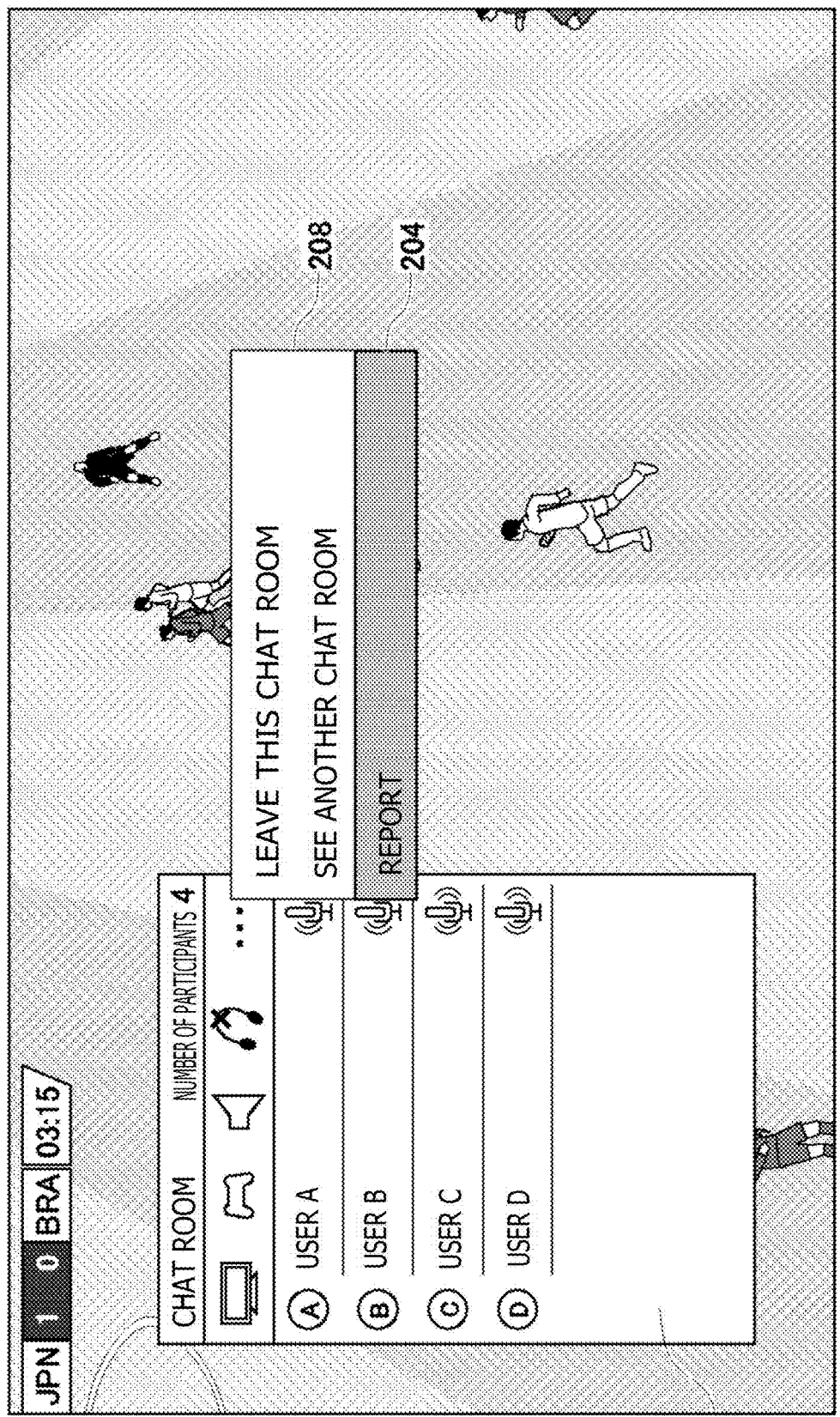
FIG. 6 is a diagram illustrating an example of a sub-window containing selectable menu items.

FIG. 6 illustrates an example of a sub-window 208 containing selectable menu items. The room image generating section 122 displays the sub-window 208 containing one or more menu items. Among these items, "Report" is an item for the user to notify the management server 14 of a chat member who has made an inappropriate remark during the chat. A procedure for creating reporting (a report) regarding inappropriate remarks because one member has made an inappropriate remark and sending the created report to the management server 14 will be described below.

When user A moves the selection frame 204 to the item "Report" and performs a selecting operation, the operation receiving section 104 receives that the item "Report" is selected, and activates the report creating section 170. The function of the report creating section 170 may be implemented as part of system software. The report creating section 170 instructs the input image generating section 124 to create an input image for the user to create a report, and instructs the chat data processing section 140 to prohibit overwriting in the recording section 150. As a result, the first recording section 152 holds the most recent 5-minute chat data recorded immediately before the report item is selected, and the second recording section 154 holds the most recent 5-minute metadata recorded immediately before the report item is selected.

Upon receiving an instruction from the report creating section 170, the input image generating section 124 sequentially generates a plurality of input images for the user to create a report, and the output processing section 160 displays the input images on the output device 4. User A inputs necessary information according to guidance (explanation) included in each input image. The report creating section 170 receives information input by the user in each input image and creates a report regarding the chat. A plurality of input images to be displayed on the output device 4 will be described below.

Figure 7:
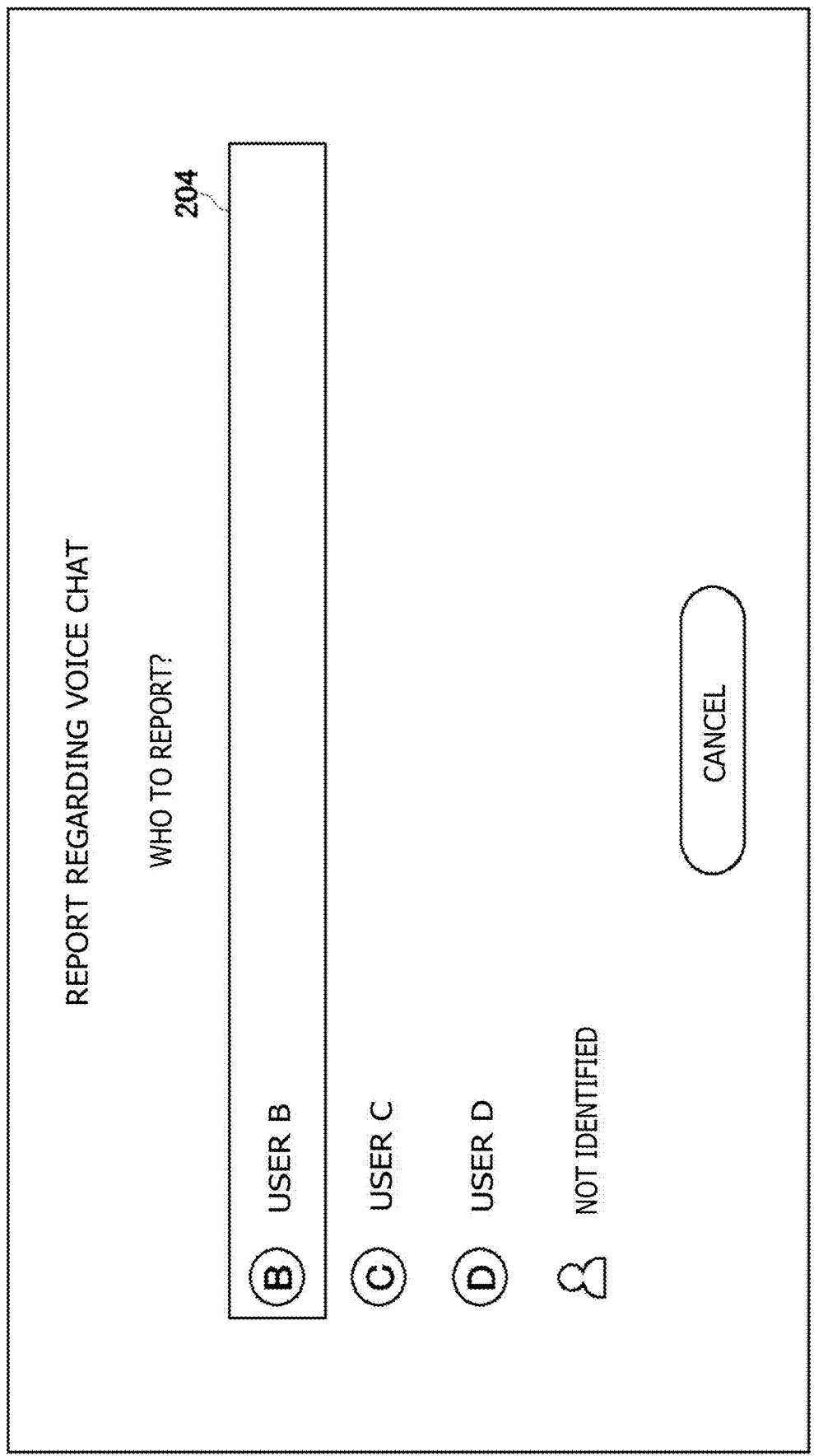
FIG. 7 is a diagram illustrating an example of a member selection image for selecting a chat member to report.

FIG. 7 illustrates an example of a member selection image for selecting a chat member to report. The input image generating section 124 refers to the metadata held in the second recording section 154, identifies members who made utterances during the most recent 5 minutes, and displays the identified members in a selectable manner. By identifying the member who actually made utterances, the input image generating section 124 can prevent the member selection image from including members who have not made any utterances. Note that the input image generating section 124 may inquire the members of the chat room from the chat management section 130, and identify the members of the chat room, thereby displaying the members of the chat room in a selectable manner. At this time, if user A has participated in a plurality of chat rooms during the past 5 minutes, the input image generating section 124 displays the members of the plurality of chat rooms in a selectable manner. User A selects the member who made the inappropriate remark by positioning the selection frame 204 to the display area of the member who made the inappropriate remark and performing a selection operation. The report creating section 170 receives information regarding the selected member.

The option "Not identified" is selected in the case where user A cannot identify the member who made the inappropriate remark. For example, in the case where user A is not friends with users B, C, and D and is playing the game with them for the first time, it may be difficult to identify the member who has made the inappropriate remark. In such a case, user A has only to select the option "Not identified." In the embodiment, user A positions the selection frame 204 to the display area of user B and performs an operation to select user B as a chat member to be reported.

FIG. 8 illustrates an example of a reason selection image for selecting a report reason. The input image generating section 124 displays a plurality of report reasons in a selectable manner. User A selects a reason for reporting by positioning the selection frame 204 to one of the reasons for reporting and performing a selection operation. The report creating section 170 receives the selected report reason.

Figure 9:
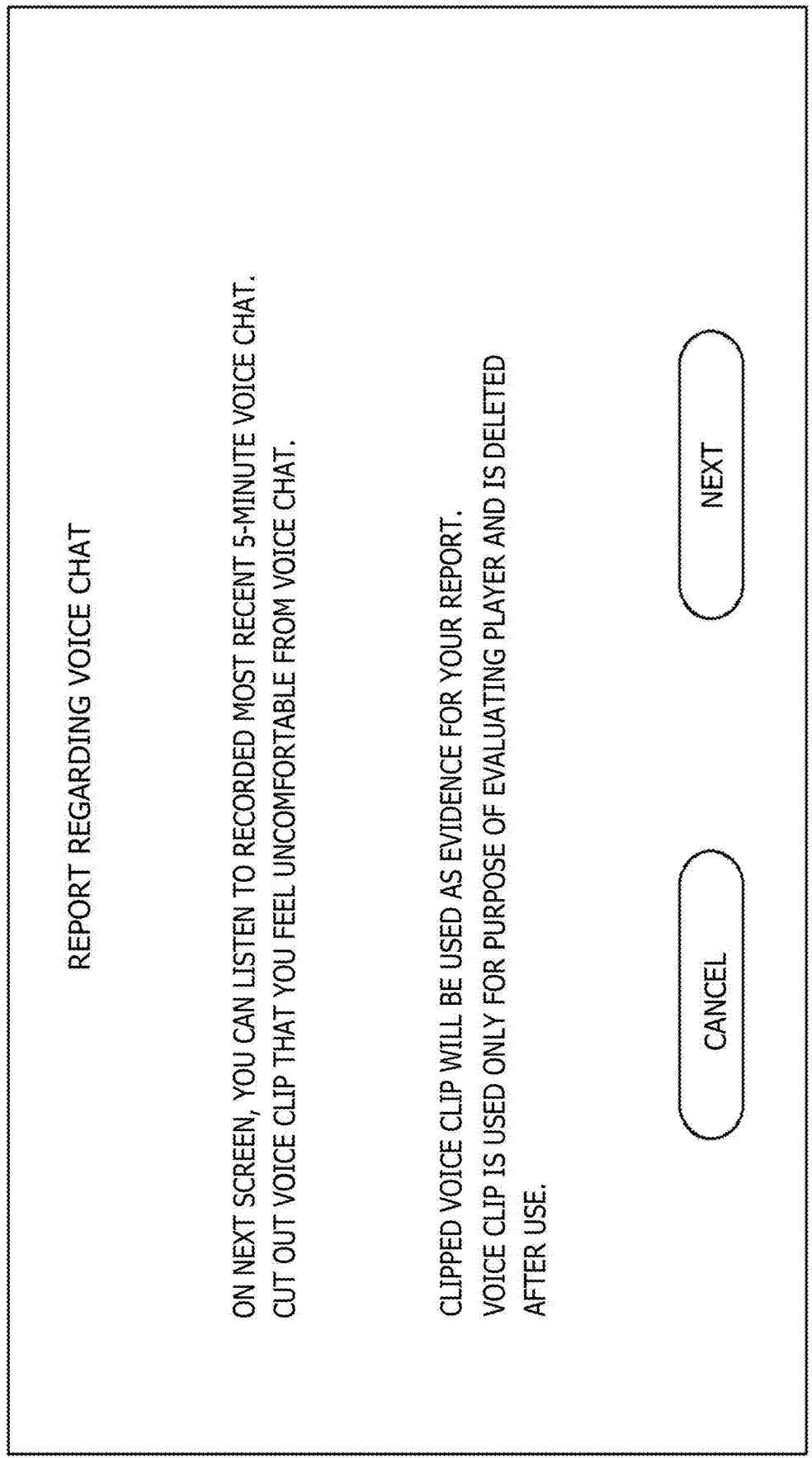
FIG. 9 is a diagram illustrating an example of an explanatory image regarding a voice clip.

FIG. 9 illustrates an example of an explanatory image related to a voice clip. In the explanatory image, it is described that the user will now select a voice clip that is identified as the point where the user felt uncomfortable and that the voice clip will only be used for evaluation purposes and will be deleted after use. After reading the explanation, the user A selects "Next."

Figure 10:
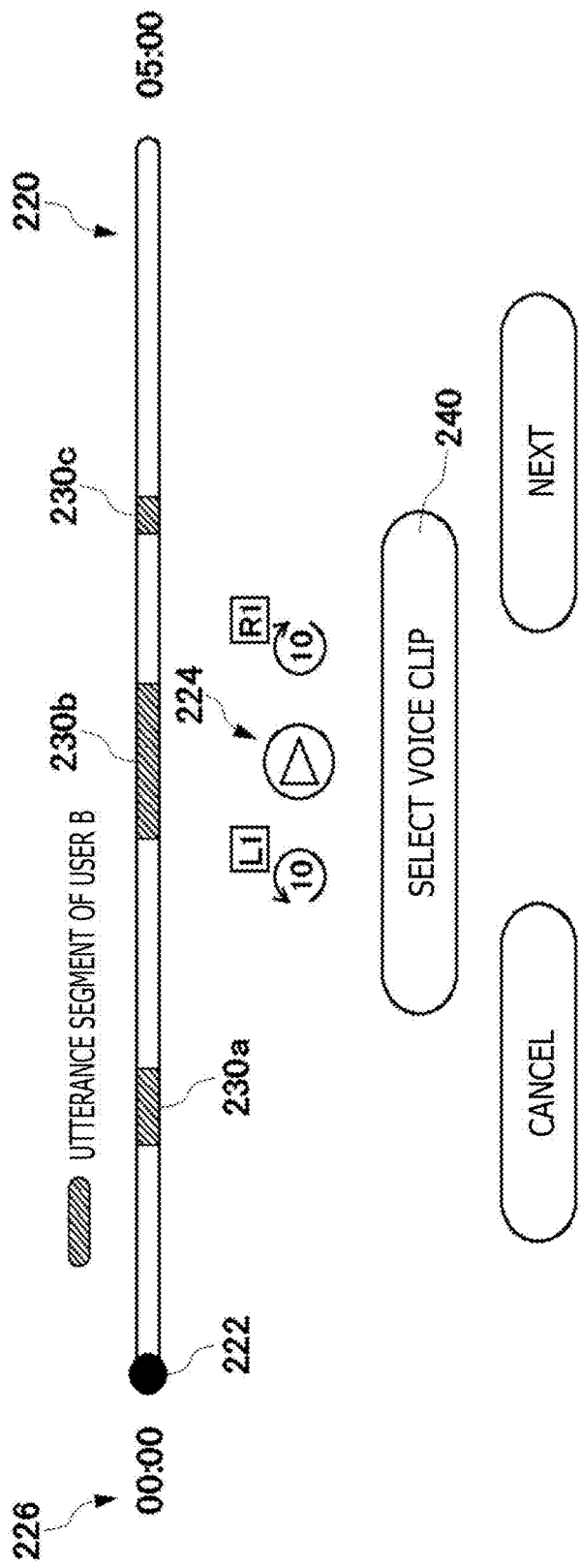
FIG. 10 is a diagram illustrating an example of a range selection image for selecting a voice clip.

FIG. 10 illustrates an example of a range selection image for selecting voice clips. The input image generating section 124 generates a range selection image for the user to select the time range of the chat data to be included in the report from the 5-minute chat data recorded in the first recording section 152. The range selection image includes a seek bar 220 and a slider 222 that slides on the seek bar 220. The time displayed at the left end of the seek bar 220 indicates reproducing time 226 and corresponds to the position of the slider 222 on the seek bar 220. The time displayed at the right end of the seek bar 220 indicates the total time period of chat data. When user A presses a play button 224, the output processing section 160 reproduces chat data recorded in the first recording section 152. The output processing section 160 outputs the reproduced sound from the headphones of the headset 9.

The input image generating section 124 causes the range selection image to include information indicating the time zone in which the specific person has occurred. In the embodiment, the input image generating section 124 identifies the time zones during which user B selected in the member selection image illustrated in FIG. 7 made an utterance from the 5-minute metadata recorded in the second recording section 154 and displays the identified time zones as utterance segments 230a, 230b, and 230c in association with the seek bar 220. In this example, the input image generating section 124 displays the utterance segments 230a, 230b, and 230c (which may be referred to as "utterance segments 230" in the case where they are not particularly distinguished from one another) on the seek bar 220 in a color different from that of the seek bar 220. In another example, the input image generating section 124 may display the utterance segments 230 as bar-shaped areas parallel to the seek bar 220. In any case, the input image generating section 124 preferably displays the utterance segments 230 in which user B has made an utterance, such that the utterance segments 230 can be recognized as a time range on the seek bar 220.

Figure 11:
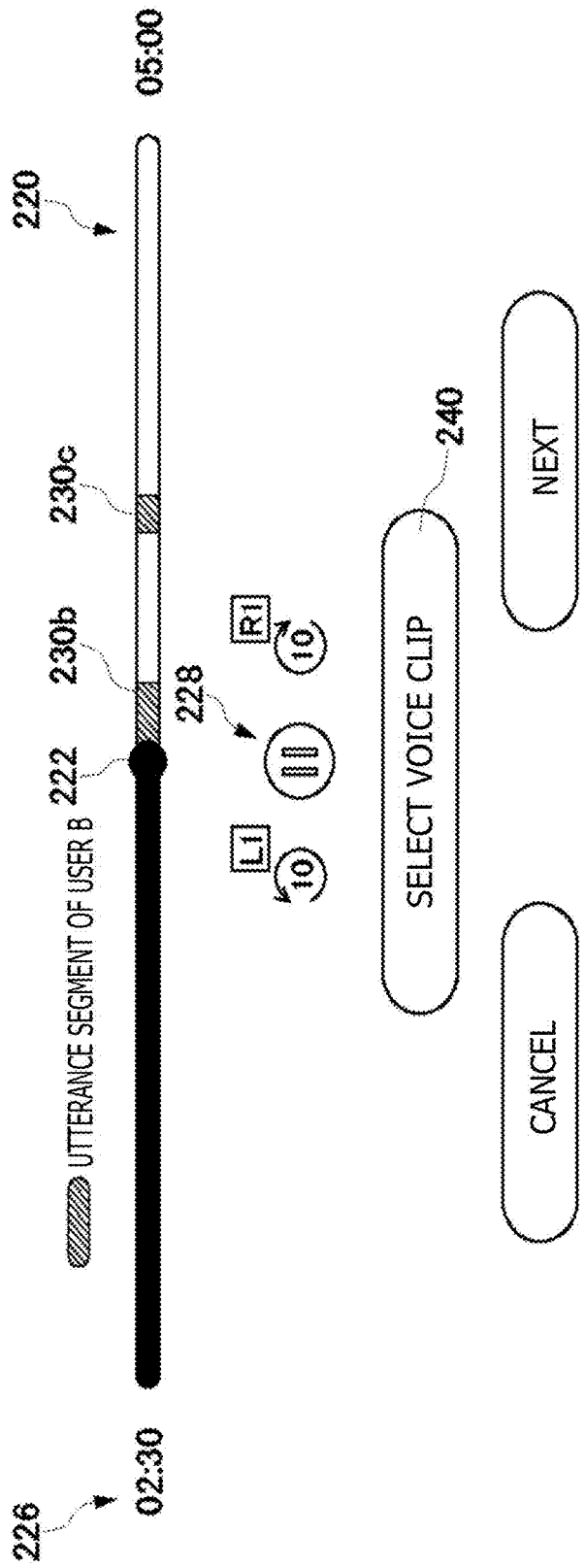
FIG. 11 is a diagram illustrating a state where voice data is reproduced.

FIG. 11 illustrates a state where voice data is reproduced. In the example illustrated in FIG. 11, the output processing section 160 reproduces the chat data at the position of 2 minutes and 30 seconds. A pause button 228 is displayed during the reproduction of the voice data, and when user A presses the pause button 228, the output processing section 160 pauses the reproduction of the chat data. As illustrated in the right and left of the pause button 228, the "L1" button of the input device 6 is assigned a 10-second rewind function, and the "R1" button is assigned a 10-second fast-forward function; user A can thus use these buttons. When user A finds an inappropriate remark of user B included in the chat data, user A presses a clip selection button 240 at that timing.

Figure 12:
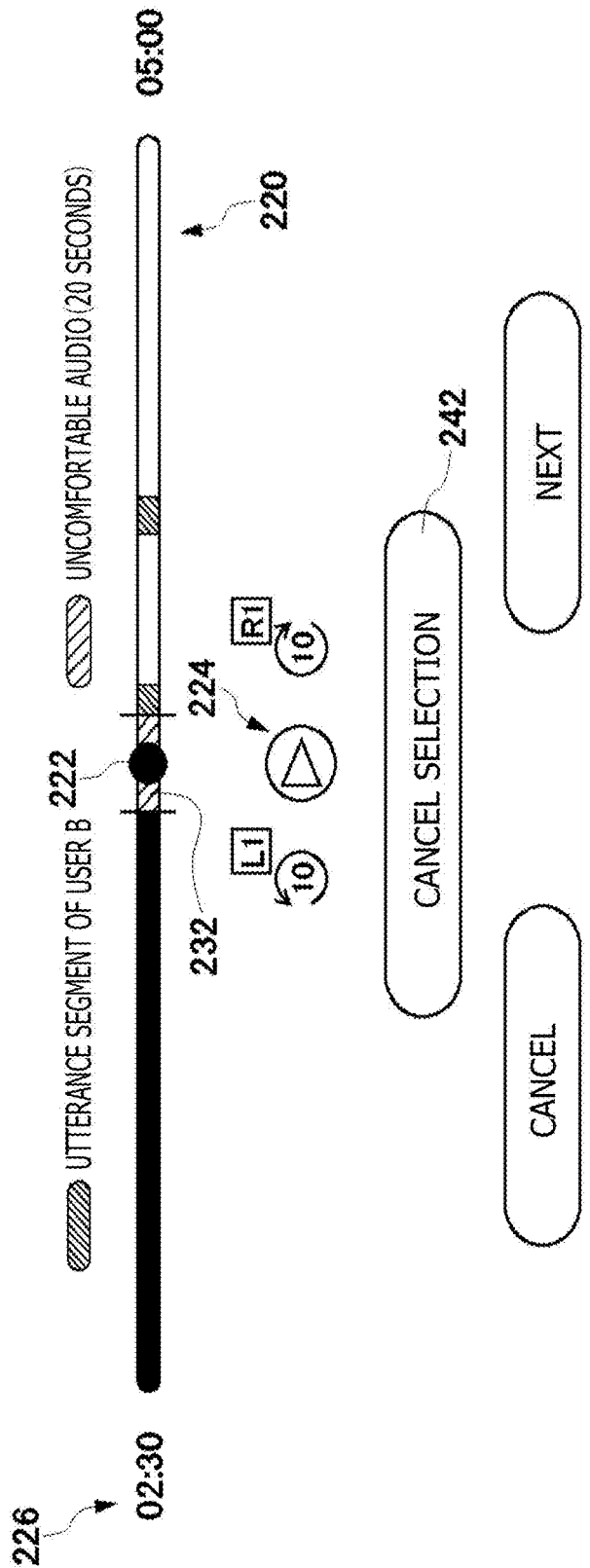
FIG. 12 is a diagram illustrating a state where a user has selected a voice clip.

FIG. 12 illustrates a state where user A has selected a video clip. When user A presses the clip selection button 240, the report creating section 170 selects a range of voice data which starts at a position of a predetermined number of seconds before the time position of the slider 222 and which ends at a position of a predetermined number of seconds after the time position of the slider 222. This voice data range represents a voice clip 232 to be included in the report. In the embodiment, when the clip selection button 240 is pressed, the report creating section 170 may set, as the voice clip 232, chat data in a range from the position of 10 seconds before the time position of the slider 222, which is the starting point, to the position of 10 seconds after the time position of the slider 222, which is the end point. Note that, in the embodiment, the chat data in the range of 20 seconds before and after the slider 222 is cut out as the voice clip 232, but a longer-range chat data (for example, 40 seconds before and after) may be cut out, or a shorter-range chat data may be cut out as well. User A needs to determine the timing of pressing the clip selection button 240 such that user B's inappropriate remark is included in the voice clip 232.

User A can cancel the once selected voice clip 232 by pressing a selection cancellation button 242. User A adjusts the time position of the slider 222 such that user B's inappropriate remark is well included within the 20-second range, and presses the clip selection button 240. When user A selects "Next," the report creating section 170 clips and acquires the set voice clip from the chat data recorded in the first recording section 152. At the same time, the report creating section 170 clips and acquires the metadata of the corresponding time range from the metadata recorded in the second recording section 154. Hence, the report creating section 170 acquires chat data for a predetermined time period including user B's inappropriate remark and metadata including the user ID of the person who made the utterance in the chat data.

Figure 13:
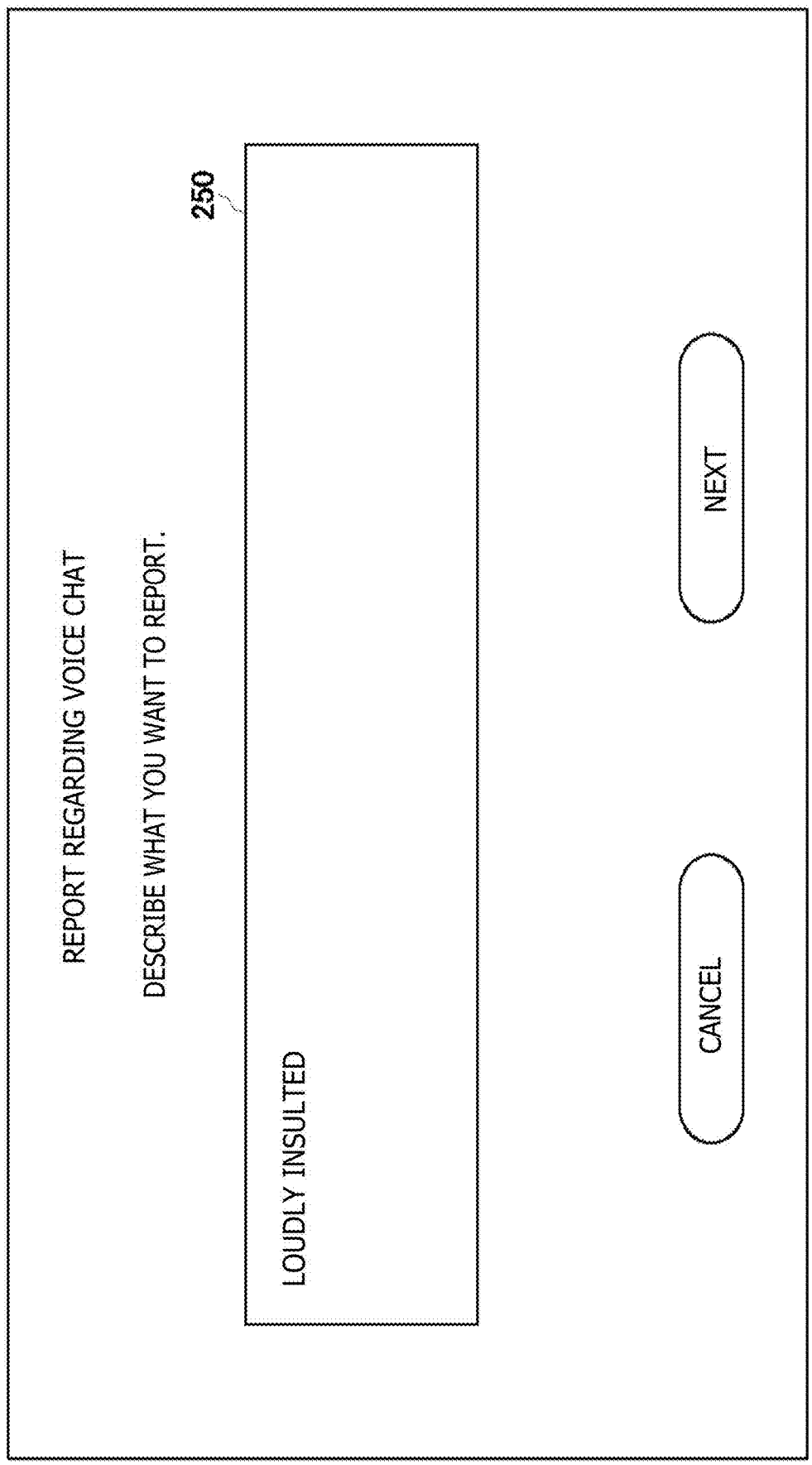
FIG. 13 is a diagram illustrating input fields for inputting report contents.

FIG. 13 illustrates an input field 250 for inputting the report contents. User A can enter the specific contents of the report in the input field 250. When user A selects "Next," the report creating section 170 acquires the text data entered in the input field 250.

FIG. 14 illustrates an example of a report summary. The report creating section 170 creates a report regarding the chat on the basis of the received information. To be specific, the report creating section 170 creates a report including the chat data and metadata of the time range selected by user A and information input by user A, and the output processing section 160 displays the summary of the report to the output device 4. When user A selects "Send report," the report transmitting section 172 transmits the created report regarding the chat to the management server 14. When the administrator of the management server 14 receives the report related to the chat from the information processing device 10, the administrator analyzes the voice data included in the report and investigates the content of the remark. Note that the management server 14 may use a machine learned model or the like to automatically perform the work of analyzing the content of the remark.

The present disclosure has been described above in reference to the embodiment. It should be understood by those skilled in the art that this embodiment is an example, and that various modifications can be made to combinations of respective constituent elements and respective steps of processing, and such modifications are also within the scope of the present disclosure.

Although the seek bar 220 is illustrated in FIG. 10, the input image generating section 124 may display a waveform that expresses the size of the voice data included in the chat data, along the seek bar 220. This makes it possible to recognize at a glance when a chat member shouts out. Further, the report creating section 170 may have voice recognition and voice analysis functions to automatically extract inappropriate words and sentences from the chat data, and the input image generating section 124 may display the extracted words and sentences in association with the seek bar 220.

In the embodiment, the information processing devices 10 of respective users are connected to each other in a P2P way, and voice data is transmitted and received between the plurality of information processing devices 10, thereby realizing a voice chat. In a modification example, a chat server may be provided in the server system 12, so that the chat server may receive chat data from each information processing device 10, and mix the chat data to transmit the mixture to each information processing device 10.

In the embodiment, the information processing device 10 processes the chat data, but in a modification example, the chat server may process the chat data. In this case, the chat server functions as an information processing device including the system image generating section 120, the chat management section 130, the chat data processing section 140, the recording section 150, the output processing section 160, and the report creating section 170, and may support creation of a report regarding a chat by causing the information processing device 10 of the user to display an input image and receiving input information from the information processing device 10.

INDUSTRIAL APPLICABILITY

The present disclosure can be used for a technique that supports the creation of reports regarding chats.

REFERENCE SIGNS LIST

1: Information processing system
10: Information processing device
12: Server system
14: Management server
16: Session server
100: Processing unit
102: Communication unit 104: Operation receiving section
110: Game executing section
112: Game image generating section
114: Game sound generating section
116: Session management section
120: System image generating section
122: Room image generating section
124: Input image generating section
130: Chat management section
140: Chat data processing section
150: Recording section
152: First recording section
154: Second recording section
160: Output processing section
170: Report creating section
172: Report transmitting section

The invention claimed is:

1. An information processing device that supports creation of a report regarding a chat, the information processing device comprising:
 a recording section that records chat data, wherein the chat data comprises voice data characterizing an utterance made by a first user;
 an image generating section that generates a user interface for a second user to create the report, wherein the user interface comprises a range selection interface for the second user to select one or more time ranges of the voice data that are associated with a respective inappropriate sound segment from the utterance; and
 a report creating section that receives information input by the user and creates the report regarding the chat, wherein the report comprises chat data associated with the one or more time ranges.

2. The information processing device according to claim 1,
 wherein the recording section records the chat data for a predetermined time period of chat.

3. The information processing device according to claim 1,
 wherein the recording section is a ring buffer.

4. The information processing device according to claim 1,
 wherein the recording section includes a first recording section that records the chat data in association with time information, and a second recording section that records metadata including information indicating a person who has made the utterance, in association with time information.

5. The information processing device according to claim 1,
 wherein the image generating section causes the range selection user interface to include information indicating a time period in which a specific person has made the utterance.

6. The information processing device according to claim 1,
 wherein the report creating section generates the report containing the chat data in the time range selected by the user.

7. A computer-implemented method comprising:
 recording chat data, wherein the chat data comprises voice data characterizing an utterance made by a first user;
 generating a user interface for a second user to create a report, wherein the user interface comprises a range selection interface for the second user to select one or more time ranges of the voice data that are associated with a respective inappropriate sound segment from the utterance; and
 receiving information input by the user; and
 creating the report regarding the chat, wherein the report comprises chat data associated with the one or more time ranges.

8. The method of claim 7, wherein the chat data is stored for a predetermined time period of chat.

9. The method of claim 7, wherein the chat data is stored in a ring buffer.

10. The method of claim 7,
 wherein the chat data is stored in association with time information, and
 metadata including information indicating a person who has made the utterance is stored in association with time information.

11. The method of claim 7, wherein the range selection user interface includes information indicating a time period in which a specific person has made the utterance.

12. The method of claim 7, wherein the report includes the chat data in the time range selected by the user.

13. A non-transitory computer-readable medium storing instructions that, when executed by one or more computers, cause the one or more computers to perform operations comprising:
 recording chat data, wherein the chat data comprises voice data characterizing an utterance made by a first user;
 generating a user interface for a second user to create a report, wherein the user interface comprises a range selection interface for the second user to select one or more time ranges of the voice data that are associated with a respective inappropriate sound segment from the utterance; and
 receiving information input by the user; and
 creating the report regarding the chat, wherein the report comprises chat data associated with the one or more time ranges.

14. The medium of claim 13, wherein the chat data is stored for a predetermined time period of chat.

15. The medium of claim 13, wherein the chat data is stored in a ring buffer.

16. The medium of claim 13, wherein the chat data is stored in association with time information, and metadata including information indicating a person who has made the utterance is stored in association with time information.

17. The medium of claim 13, wherein the range selection user interface includes information indicating a time period in which a specific person has made the utterance.

18. The medium of claim 13, wherein the report includes the chat data in the time range selected by the user.

* * * * *